US006449476B1

(12) United States Patent
Hutchison, IV et al.

(10) Patent No.: US 6,449,476 B1
(45) Date of Patent: Sep. 10, 2002

(54) SYSTEM AND METHOD FOR INDEPENDENTLY DOWNLOADING FEATURES INTO A SET OF STORAGE LOCATIONS IN A WIRELESS COMMUNICATION DEVICE

(75) Inventors: James A. Hutchison, IV, San Diego; Eric J. Lekven, Carlsbad, both of CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/267,824

(22) Filed: Mar. 12, 1999

(51) Int. Cl.[7] ................................................ H04M 3/00
(52) U.S. Cl. ...................................... 455/418; 455/557
(58) Field of Search ................................ 455/418–419, 455/551, 556, 557, 558, 575, 433, 73

(56) References Cited

U.S. PATENT DOCUMENTS

| 5,046,082 | A | * | 9/1991 | Zicker et al. | 455/410 |
| 5,109,403 | A | * | 4/1992 | Sutphin | 455/419 |
| 5,418,837 | A | * | 5/1995 | Johansson et al. | 455/418 |
| 6,029,065 | A | * | 2/2000 | Shah | 455/419 |
| 6,125,287 | A | * | 9/2000 | Cushman | 455/575 |

FOREIGN PATENT DOCUMENTS

| WO | 9716938 | 5/1997 | ............ H04Q/7/32 |
| WO | 97/16938 | * 5/1997 | |
| WO | 9858506 | 12/1998 | ............ H04Q/7/22 |

OTHER PUBLICATIONS

Sun Microsystems, "Linker and Libraries Guide" Aug. 1, 1997, USA XP002139367 pp. 209–224.

* cited by examiner

Primary Examiner—Vivian Chin
Assistant Examiner—Eliseo Ramos-Feliciano
(74) Attorney, Agent, or Firm—Philip R. Wadsworth; Charles D. Brown; George C. Pappas

(57) ABSTRACT

A system and method for independently downloading a main program and optional features into a set of storage locations of a wireless communication device uses a memory to store the main program and a set of selected optional features. An identification element associated with one in the set of selected optional features enables the main program to interact with the one in the set of selected optional features. A programmer programs the selected optional feature programs into the memory by locating a storage location in the memory. An indicator indicates when the set of selected optional features has been stored in the memory. The memory can further contain a linking element and a pointer to identify storage locations in the memory. The invention allows the set of selected optional features to be stored after the main program is stored in the memory.

16 Claims, 4 Drawing Sheets

SYSTEM AND METHOD FOR INDEPENDENTLY DOWNLOADING FEATURES INTO A SET OF STORAGE LOCATIONS IN A WIRELESS COMMUNICATION DEVICE

FIELD OF THE INVENTION

The present invention is related generally to wireless communication devices, and more particularly, to a system and method for independently downloading features into a memory location of a wireless communication device.

BACKGROUND OF THE INVENTION

Modern wireless communication devices, such as cellular telephones, are very popular because they are convenient to use and provide many features and options that are difficult to implement on conventional telephones. For example, a wireless communication device can be programmed and customized with the specific dialing plans and dialing patterns for a particular country. In this fashion, wireless communication devices can be mass-produced for export to a foreign country and ready to use immediately without additional programming. For the United States, a wireless communication device can be programmed to accommodate 10-digit telephone numbers of the North American Numbering Plan and the "star" codes used to activate numerous options available in the telephone carrier's system.

A wireless communication device can be further programmed for operation with data encryption schemes, for operation with foreign language text, and to allow its user to play computerized wireless games. These features can be implemented in various combinations in each wireless communication device to provide the user with several customized features.

The optional features discussed above are pre-programmed into the wireless communication device by its manufacturer during the production process. The data and executable code/instructions that are associated with and that operate each of these optional features are combined with the standard data and executable code/instructions (i.e., the main program) that control the operation of the wireless communication device. The combined program is then written into an electronically erasable read-only-memory (EEPROM) of the wireless communication device. That is, the optional features and the main program are both written or downloaded into the EEPROM as a single program and at the same time. Other forms of writeable non-volatile storage may also be used (e.g., FERAM, battery-backed RAM, OPT RAM, etc.).

There are several significant disadvantages to utilizing a single download. First, because the main program and the optional features need to be downloaded as a single program, the manufacturer has to predetermine which optional features will be required by the wireless communication device, and then assimilate the optional features into the main program. This method is undesirable because it is often difficult to predict which optional features will be requested by a given customer, and it is an inefficient use of memory space to account for every optional feature by combining all possible optional features with the main program.

Second, because the optional features and the main program are combined and downloaded together, additional optional features cannot be added to the EEPROM after the initial download is made. If the manufacturer desires to add additional optional features to the wireless communication device, then the entire EEPROM needs to be erased or replaced, with the updated combination of the optional features and the main program being subsequently downloaded into a new blank EEPROM. Also, because the optional features are bound to the main program as a single combined program, portions of the main program itself may need to be updated each time the manufacturer simply wants to add a single optional feature. Obviously, this updating has to be done before the combined program is downloaded into the EEPROM, because conventional systems cannot update the combined program once it is downloaded.

Third, the large block of information resulting from combining the optional features with the main program may inherently make downloading more difficult. A single continuous storage block of the EEPROM may need to be pre-allocated to accommodate the entire block of downloaded information. It is possible that the block of downloaded information cannot be separated into portions which are then stored at scattered storage blocks of the EEPROM. For instance, it may be desirable in some instances to write the main program into one storage block of the EEPROM and then write the optional features into wherever other scattered storage blocks of the EEPROM are available.

Accordingly, there exists a need to be able to customize a wireless communication device with optional features in a manner such that the optional features can be downloaded into the EEPROM independent of the downloading of the main program. The present invention provides solutions to the problems described above as will be apparent from the following detailed description and accompanying figures.

SUMMARY OF THE INVENTION

The present invention is embodied in a system and method for downloading optional features into a memory of a wireless communication device. In an exemplary embodiment, the wireless communication device comprises the memory to store a main program to control operation of the wireless communication device. A set of selectable optional features is programmable into the memory independently of the main program. The main program uses identification elements associated with the set, or sets, of selectable optional features to interact with the selected set of selectable optional features.

An exemplary embodiment further includes a linking element to also associate the main program to the set of selectable optional features, the linking element being inactive until the set of selectable optional features is programmed into the memory. The linking element can be a portion of the main program and can include a plurality of pointers to identify a plurality of corresponding storage locations in the memory. The main program can also include a searching program to search the memory for a storage location corresponding to the set of selectable optional features, the storage location having an indicator to indicate when the set of selectable optional features is stored in the storage location.

The linking element can also include a pointer identifying a secondary linking element, the secondary linking element having a plurality of pointers to identify a corresponding plurality of storage locations in the memory. In exemplary embodiments of the invention, the set of selectable optional features can also include the secondary linking element or a pointer to identify a storage location in the memory.

A programmer and a port coupled to the memory receives the set of selectable optional features. The programmer sends the set of selectable optional features to the port for storage in the programmable memory independent of a storing of the main program. The set of selectable optional features could include features such as a dialing plan system, encryption system, browser system, or a language system, or diagnostic extensions and alterations, system management, selection and presentation extensions and alterations, and audio handling extensions and alterations, productivity tools, and games.

BRIEF DESCRIPTION OF THE DRAWINGS

In the figures, like reference numerals refer to like parts throughout the various views unless otherwise indicated.

DETAILED DESCRIPTION OF THE PREFERRED EMBODIMENTS

Figure 1:
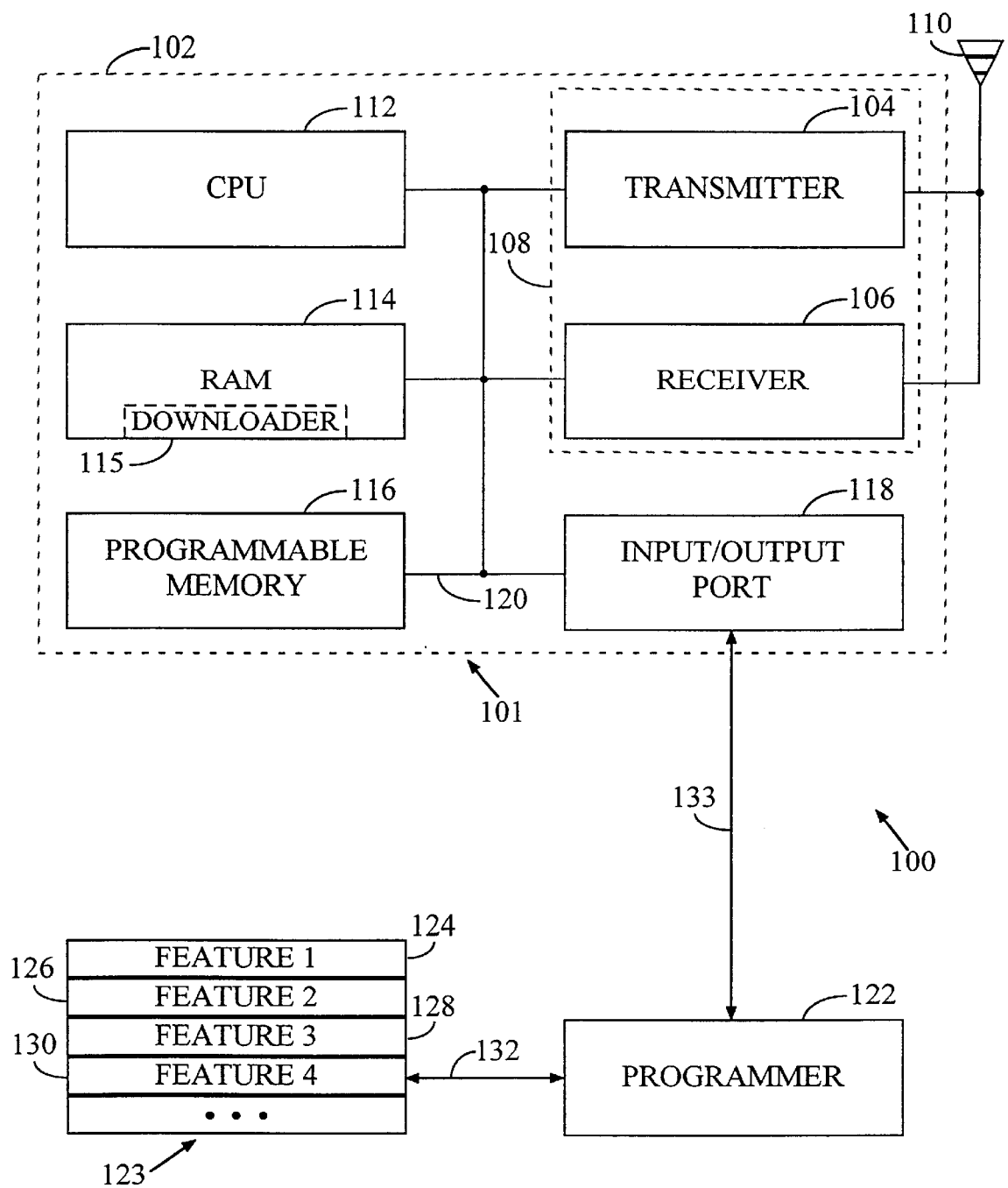
FIG. 1 is a functional block diagram of an exemplary embodiment of the wireless communication system of the present invention.

The present invention is embodied in a system 100 illustrated in the functional block diagram of FIG. 1. The system 100 includes a wireless communication device 101, which may be embodied in a cellular telephone. The system 100 includes a housing 102 that contains a transmitter 104 and a receiver 106 to allow transmission and reception of data, such as audio communications, between the system 100 and a remote location, such as a cell site controller (not shown). The transmitter 104 and the receiver 106 may be combined into a transceiver 108. An antenna 110 is attached to the housing 102 and is electrically coupled to the transceiver 108. The operation of the transmitter 104, receiver 106, and antenna 110 is well known in the art and need not be described herein. Although described herein as a cellular telephone, the principles of the present invention are applicable to a variety of wireless communication devices including, but not limited to, cellular/PCS, radio telephone, and the like. Accordingly, the present invention is not limited by the specific form of wireless communication device.

The wireless communication device 101 has a central processing unit (CPU) 112, which controls operation of system 100. The CPU 112 may perform all the tasks involved in the operation of the system 100, or only a portion of them, where the remaining tasks are delegated to other processing units (not shown) included in the system 100.

The wireless communication device 101 includes one or more memory units, which may be a random-access-memory (RAM) 114 and a programmable memory 116, such as an electronically erasable programmable read-only-memory (EEPROM). The RAM 114 could include non-volatile RAM to store information that must be present upon powering the wireless communication device 101. As is known in the art, portions of the RAM 114 can be used as shadow read-only-memory (ROM) to store information, such as data and executable code/instructions, normally stored in the programmable memory 116 or in a standard ROM (not shown). Additionally, while FIG. 1 makes a distinction between the programmable memory 116 and the RAM 114, one skilled in the art would appreciate that the RAM 114 is also a type of "programmable" memory. The CPU 112 processes the information stored in the RAM 114 or in the programmable memory 116 to operate the wireless communication device 101.

The wireless communication device 101 further includes an input/output port 118 to receive a set of features 123, sometimes referred to as a "bundle," from a programmer 122 located outside of the housing 102. The programmer 122 is a system of hardware and software that enables features to be downloaded into the wireless communication device 101. The system 100 can also have a downloader 115 in the RAM 114 to receive features from the programmer 122 and to write the received features into the appropriate memory location. As such, the downloader 115 acts as an intermediate downloading program between the programmer 122 and the programmable memory 116 or the RAM 114.

For purposes of present invention, the term "features" used throughout this description is understood to include data, executable software code, and any of their accompanying information, such as identification (ID) codes and variables, that are written into the programmable memory 116 or into the RAM 114 by the programmer 122 or by the downloader 115. The set 123 comprises a collection of individual optional features associated with any number of individual optional features 124, 126, 128, and 130. For example, FEATURE 1, shown as 124 in FIG. 1, could correspond to data for a dialing plan of the country of India. The programmer 122 writes the optional features contained in the set 123 into the programmable memory 116 or into the RAM 114 as individual optional features (e.g., FEATURE 1) or as a "bundle" of individual optional features (e.g., FEATURE 1, FEATURE 3, and FEATURE 4). It should be noted that an individual optional feature itself also can be referred to as a "bundle," since any given individual optional feature is a "bundle" of data and executable code. Therefore, the terms "bundle" and "feature" are used interchangeably throughout this description.

It is to be appreciated that the set 123 could reside within the programmer 122 or it could be accessible to the programmer 122 via a first communication link 132. Also, while only one set 123 is shown in FIG. 1, it is to be appreciated that there may be numerous other sets accessible to the programmer 122. One of these other sets could include the main program that the wireless communication device 101 needs in order to function.

A second communication link 133 couples the programmer 122 to the input/output port 118 to allow the set 123 to be written or downloaded into the programmable memory 116 or into the RAM 114. The various components within the housing 102 are coupled together by a bus system 120, which may include a power bus, control bus, and status signal bus in addition to a data bus. However, for the sake of clarity, the various buses are illustrated in FIG. 1 as the bus system 120. In addition, although not described herein or shown in FIG. 1 because they are not relevant to what is considered to be the present invention, one skilled in the art would understand that the wireless communication device 101 has additional elements, such as a keypad, battery, and display.

Figure 2:
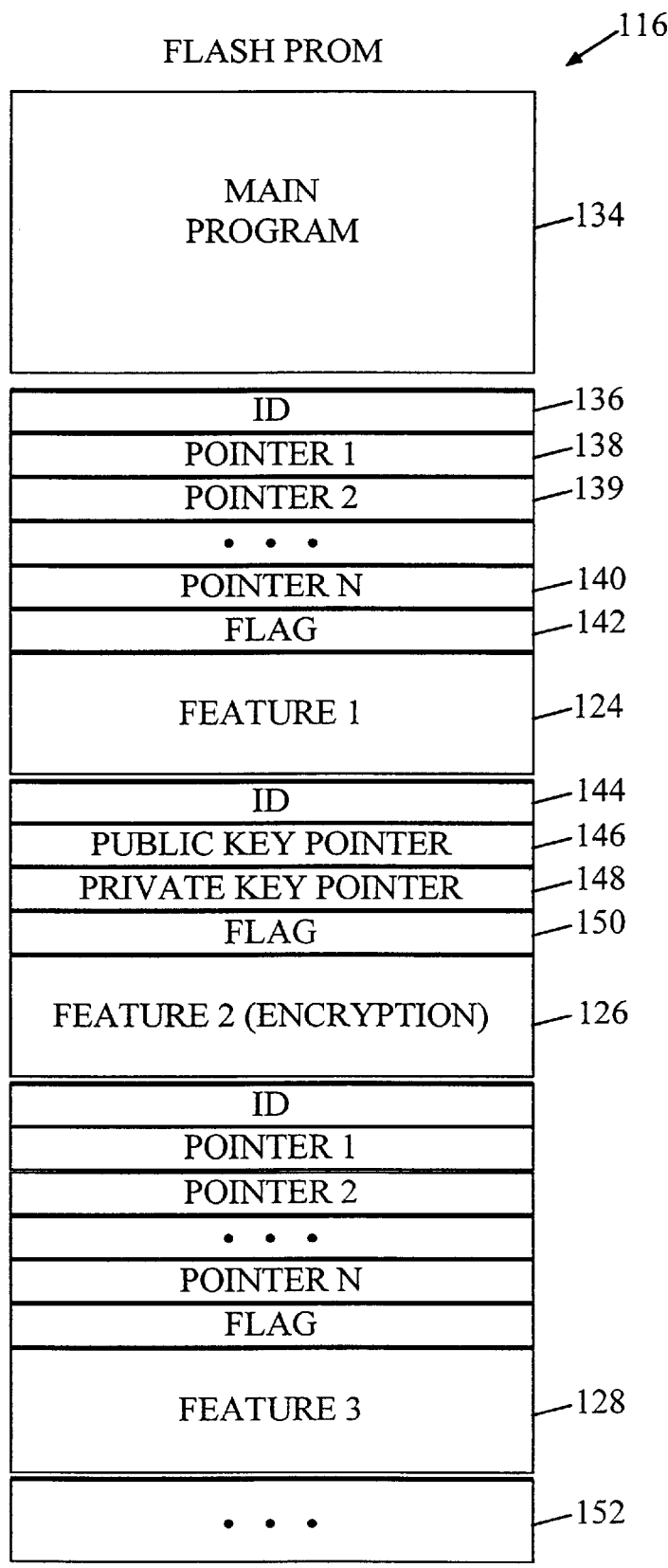
FIG. 2 is a schematic of a programmable memory of the embodiment shown in FIG. 1.
Figure 3:
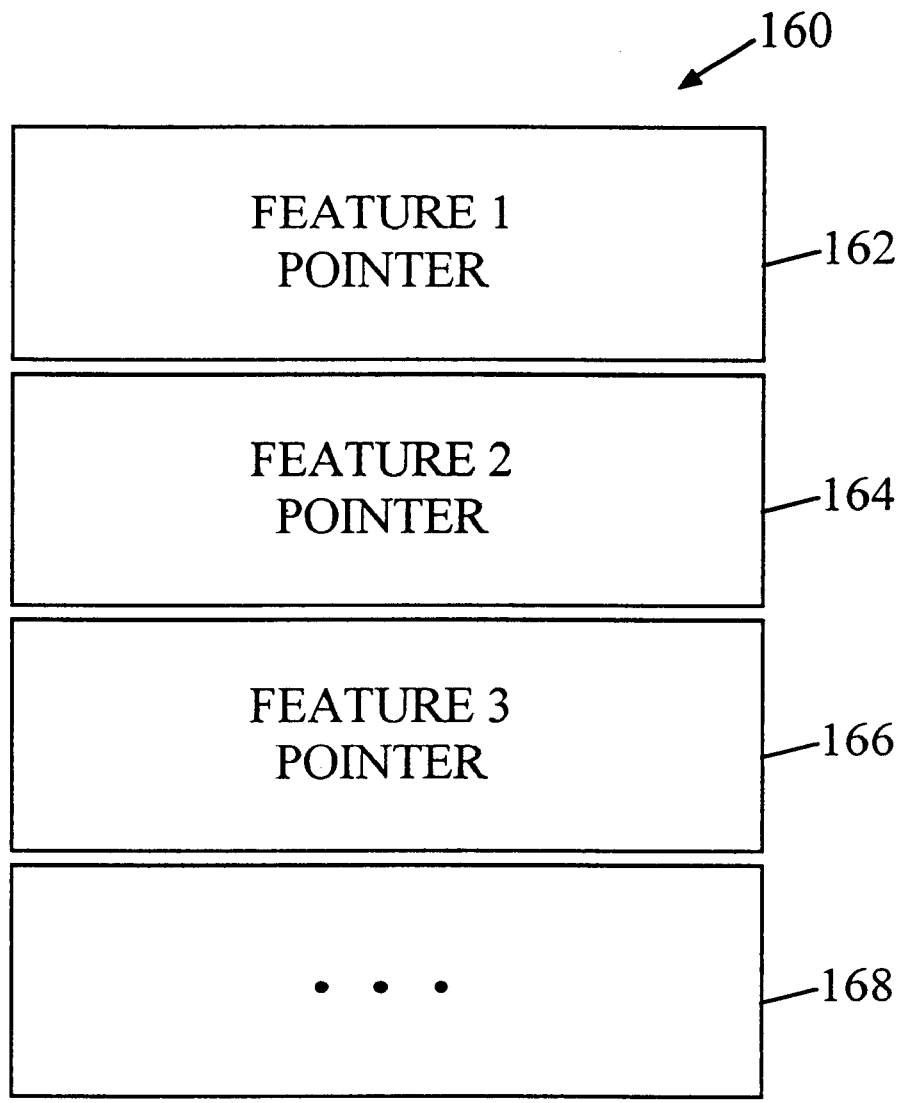
FIG. 3 is a link table for the programmable memory shown in FIG. 2.
Figure 4:
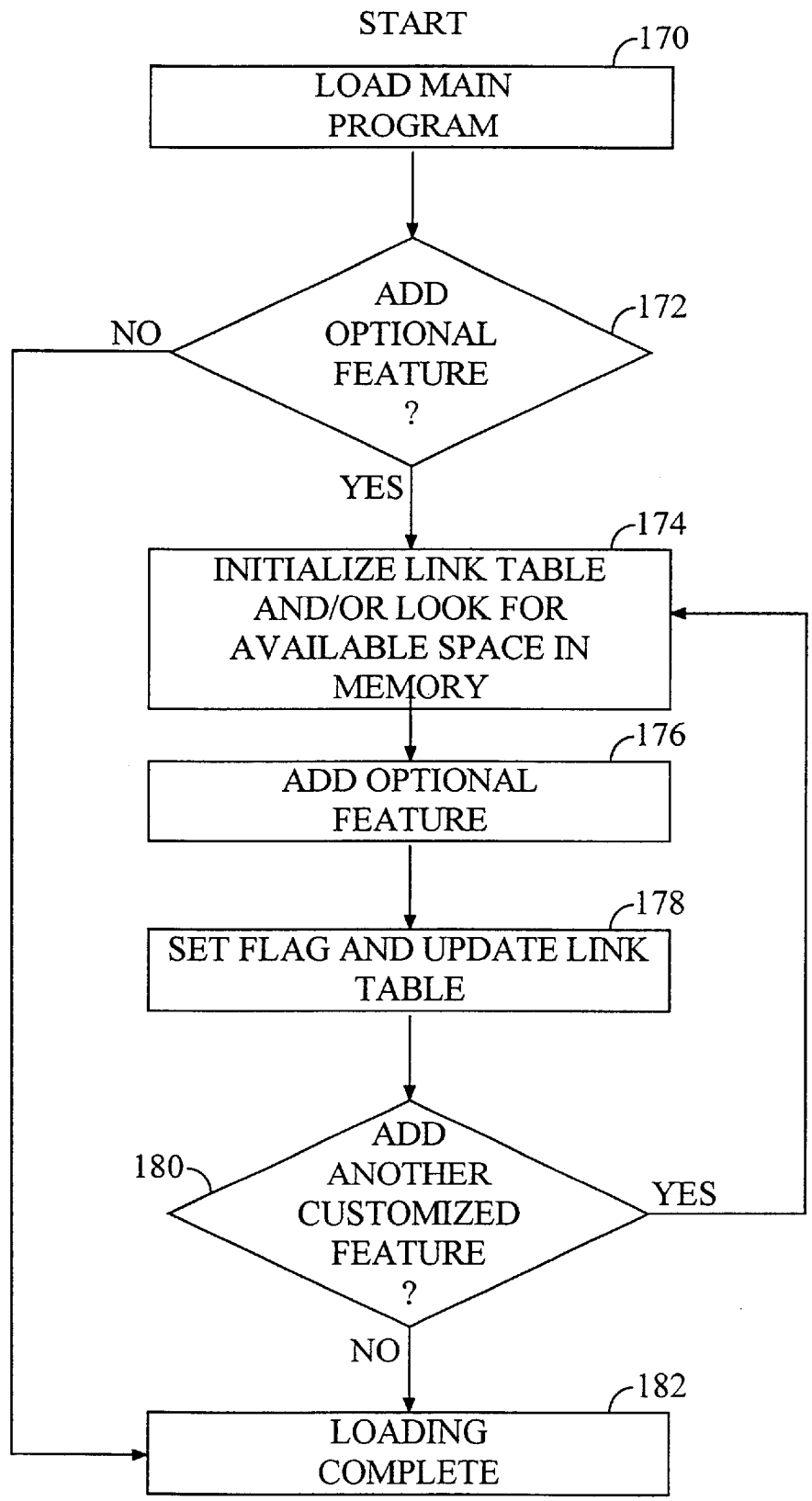
FIG. 4 is a flowchart illustrating a downloading operation for the embodiments shown in FIGS. 1–3.

As described above, conventional wireless communication systems require the combination of the optional features and the main program, with the combined program being programmed into an EEPROM. The present invention allows the downloading process for one or more optional features to be separated from the downloading process of the main program. FIGS. 2–4 illustrate how this can be done.

FIG. 2 is a schematic of the programmable memory 116 of an exemplary embodiment of the present invention. The main program is written into a storage block (memory locations) 134 of the programmable memory 116. The bundles FEATURE 1, FEATURE 2, and FEATURE 3 belonging to the set 123 of FIG. 1 and shown as 124, 126 and 128 respectively, are written into other storage blocks of the programmable memory 116. Each bundle, such as FEATURE 1, further includes an identification (ID) 136, one or more pointers 138–140, and a flag 142. An empty storage block 152 allows additional future bundles to be written into the programmable memory 116.

As mentioned above, the FEATURE 1 bundle can contain both data and executable code, and is schematically shown as the storage block 124 in the programmable memory 116. The ID 136 could include information such as a byte size of the FEATURE 1 bundle, its memory address, and a code identifying what type of bundle it is (e.g., a dialing plan).

Pointers are known to those skilled in the art, and are generally variables that contain a memory address of the programmable memory 116 or the RAM 114 where a particular set of data or executable subroutine associated with the FEATURE 1 bundle can be accessed. The access location of a bundle is sometimes referred to as an "entry point." Each bundle can include multiple pointers to any number of entry points of other bundles. For instance, POINTER 1, shown as 138, can point to a memory location in the storage block 134 that initiates activation of the FEATURE 1 bundle. As another example, POINTER 2, shown as 139, may point to another bundle that needs to run concurrently with the FEATURE 1 bundle, thereby dynamically linking the FEATURE 1 bundle with that other bundle. In this fashion, the pointers are able to dynamically link groups of programs or portions of programs with each other, eliminating the need to combine all of the programs into a single program or memory location.

The flag 142 provides indication data, such as if the particular bundle 124 is valid or successfully loaded into the EEPROM 116 or if a memory location is occupied by a bundle. Although FIG. 2 shows the ID 136, pointers 138–140, and the flag 142 as being segregated from the storage block 124, it is to be appreciated that this information can be integrated within the storage block 124 as well. Additionally, while FIG. 2 shows the optional features being located in storage blocks 124, 126, and 128 of the programmable memory 116, one skilled in the art would understand that portions of these features may be written into the non-volatile portion of the RAM 114 (see FIG. 1). If this is done, the information in the non-volatile RAM 114 would be linked to and accessible to the programmable memory 116 by appropriate pointers.

Another example of an optional feature and its pointers is a data encryption scheme, shown as the FEATURE 2 bundle in the storage block 126. The data and executable code to encrypt information are stored in the storage block 126. This program has an ID 144 to indicate that it is an encryption bundle and a flag 150 to indicate that the storage block 126 is loaded. Pointers 146 and 148 point to memory locations (i.e., entry points) where public and/or private decryption keys, respectively, are stored. Keys and support functions can also be stored externally to the feature and passed to the bundle by the caller that uses the feature.

In an exemplary embodiment of the invention, the main program in storage block 134 includes routines to search through the programmable memory 116 to try to find any of the optional features 124, 126, and 128. These routines use known optimization techniques to minimize the time required to search for any given optional feature. Once an optional feature is located, other routines in the main program interact with the optional feature to activate the optional feature. Accordingly, there is no requirement for the main program to initially know the specific memory location of an optional feature. The main program need only have the capability of knowing that an optional feature can be downloaded and to search the programmable memory 116 for the optional feature.

In another exemplary embodiment of the invention, a link table 160, shown in FIG. 3, may be alternatively or additionally included in the programmable memory 116 or in the non-volatile portion of the RAM 114. The link table 160 contains one or more pointers 162, 164, and 166 to conveniently locate and dynamically link entry points associated with the respective bundles 124, 126, and 128. That is, instead of the main program of the wireless communication device 101 or the programmer 122 having to search through the entire programmable memory 116 for a particular bundle, the main program or the programmer 122 can look to the link table 160 to immediately obtain the location of a particular bundle.

The link table 160 can include a pointer that points to another link table, which in turn can point to additional bundles or link tables. In this fashion, many levels of bundles in the system 100 can be linked together by pointers and link tables. Some exemplary embodiments of the link table 160 may also have a location 168 to allow additional pointers (pointing to another link table or to a bundle) to be added to the link table 160 as new bundles and link tables are written into the programmable memory 116. Although not shown in FIG. 3, the link table 160 can also have a flag or ID associated with each pointer 162, 164, and 166. For instance, the pointer 162 can have a flag to indicate when the memory location it is pointing to is loaded with a bundle.

The main program in the storage block 134 contains a pointer (not shown) to the link table 160 to provide the appropriate operating interrelationship and linking between the main program and the link table 160. Alternatively, the link table 160 may be incorporated within the main program itself. Further, unused storage blocks of the programmable memory 116 can be pre-allocated for future downloads of optional features and individually addressed and vectored via pointers in the link table 160. In other exemplary embodiments that do not utilize a link table 160, the main program can contain an optional feature list or subroutines to activate each optional feature. The main program can then identify and activate a later-downloaded optional feature by using conventional function call commands.

In an exemplary embodiment of the invention that utilizes a link table 160, the main program and the link table 160 are loaded together as a combined program during the initial downloading process. The optional features need not be downloaded at this time, but the manufacturer can include pointers in the link table 160, such as encryption and dialing plan pointers, in anticipation that the bundles for these features will be subsequently loaded in the future. That is, by loading the link table 160 having predetermined pointers with the main program, the main program has a mechanism for knowing that new bundles can be added, what the bundles are, where the bundles will be located, and can then dynamically link to the bundles. As will be explained below, the link table 160 is in an inactive default stage when it is first loaded into the wireless communication device 101. The link table remains in the default stage until initialized by the programmer 122 when a bundle is to be downloaded.

In summary, an exemplary embodiment of the invention allows optional features to be downloaded separately from the main program. Even though the optional features and the main program are downloaded separately, they can nevertheless interact with and access each other through the use of pointers. While the present invention still allows the main program to be combined with optional features in a single download, as will be described next, the present invention removes the requirement of having to write the main program into the programmable memory 116 concurrently with the optional features and the dynamic loading feature allows optional features to be added or altered without having to reprogram the entire programmable memory 116. For example, the programmable memory 116 may initially be programmed with a version of the FEATURE 2 (i.e., encryption) bundle 126 for domestic use in the United States. At a subsequent time, it may be desirable to replace the domestic version of the encryption with a version of encryption suitable for exportation. The dynamic loading of system 100 allows the user to reprogram only the FEATURE 2 bundle 126 as well as pointers, if necessary, without the necessity of reprogramming the entire programmable memory 116.

FIG. 4 shows a flowchart illustrating the downloading process for the programmable memory 116 shown in FIG. 2. In embodiments that utilize the downloader 115, it is assumed that the downloader 115 (see FIG. 1) is already in place in the RAM 114. The downloader 115 interacts with the programmer 122 to program the programmable memory 116. The operation of the programmer 122 and the downloader 115 is well known in the art and need not be described in detail herein.

At step 170 of an exemplary embodiment of the invention, the main program associated with the basic operation of the wireless communication device 101 is downloaded/written first by the programmer 122 into the storage block 134 of the programmable memory 116. In embodiments where the link table 160 is to be used, the link table 160 having predetermined pointers but in an inactive default stage, is also loaded along with the main program during step 170. The link table 160 need not be necessarily written into the storage block 134. If needed, the main program in the storage block 134 can contain a pointer linking to the memory location of the link table 160.

At step 172, if a manufacturer does not wish to add any optional features to the wireless communication device 101, then the programmer 122 completes the downloading process at step 182, and the wireless communication device 101 is ready for distribution to consumers. The link table 160, if there is one downloaded, remains in its inactive state.

However, if the optional features associated with the bundles 124, 126, 128, and 130 in the set 123 are to be added, then at step 174, the programmer 122 looks for an available storage block in the programmable memory 116 to download the bundles. As previously described above, it is not required for the bundles to be downloaded into pre-assigned storage blocks. The bundles can be downloaded into any available storage block because main program in storage block 134 has search routines that search through the programmable memory 116 to locate the bundle after it has been downloaded. It should be noted that prior to step 174, the manufacturer determines whether to download the bundles 124, 126, 128, and 130 into the programmable memory 116 as individual bundles or as a combination of several bundles forming a large bundle. The bundling process is performed offline, prior to step 174, by the programmer 122.

Alternatively at step 174 for embodiments that utilize the link table 160, the programmer 122 initializes the inactive link table 160, reads the link table 160 to determine if a pointer in the link table 160 has designated a storage block for the bundle, and then goes to that storage block in the programmable memory 116 to download the bundle. The link table 160 remains in an active state once initialized by the programmer 122.

At step 176, the programmer 122 or the downloader 115 downloads the bundle into a storage block in the programmable memory 116. At step 178, the applicable flags 142 or 150 (see FIG. 2) are set by the programmer 122 to indicate that the bundle has been successfully downloaded and is functional. Also at step 178, for embodiments that utilize the link table 160, flags in the appropriate pointers 162, 164, or 166 of the link table 160 may also be set by the programmer 122 to indicate which memory blocks have been loaded. During step 178, the programmer 122 can also update the link table 160 at location 168, if necessary, to add new pointers to storage blocks where additional bundles may be loaded in succeeding downloading procedures.

While steps 176 and 178 above have been described broadly as a loading of a "bundle" into the programmable memory 116, it is understood that this "bundle" can be an optional feature, another link table, a set of pointers, alterations to the main program, or a combination of these items. Accordingly, the present invention allows the manufacturer to build upon and update the existing contents of the programmable memory 116 in a variety of ways and is not limited by the type of bundle being downloaded into the programmable memory 116.

After the bundle is downloaded into the programmable memory 116 and if no additional bundles will be added at step 180, then the downloading process is completed at step 182. If more bundles need to be added, then the process described above is repeated, starting at step 174.

In summary, the downloading process shown in the flowchart of FIG. 4 allows bundles of optional features to be added to the programmable memory 116 independently of the main program. In this fashion, the wireless communication device 101 can be customized independent of the initial programming.

From the foregoing it will be appreciated that, although specific embodiments of the invention have been described herein for purposes of illustration, various modifications may be made without deviating from the spirit and scope of the invention. For example, while the figures for the embodiments described above show the bundles being written into the programmable memory 116, a portion of a bundle, an entire bundle, or all of the bundles may be stored in the non-volatile portion of the RAM 114. These bundles are dynamically linked to each other or to the main program by pointers. Accordingly, the invention is not limited except as by the appended claims, the interpretation of which are to be made in accordance with established doctrines of claim interpretation.

What is claimed is:

1. A wireless communication device comprising:

a memory;

a main program stored in the memory to control operation of the wireless communication device;

a set of selectable optional features programmable into the memory independent of the main program;

an identification associated with at least one of the set of independently programmed selectable optional features, the main program using the identification to interact with the at least one of the set of independently programmed selectable optional features; and a linking element to associate the main program with the set of selectable optional features, the linking element having an indicator set by an external programmer to indicate when the set of selectable optional features are stored in the memory.

2. The device of claim 1 wherein the linking element is a portion of the main program and includes a plurality of pointers to identify a plurality of corresponding storage locations in the memory, the plurality of corresponding storage locations storing a corresponding selectable optional feature in the set.

3. The device of claim 1 wherein the main program includes a searching program to search the memory for a storage location corresponding to the one of the set of selectable optional features, the storage location having an indicator to indicate when the one in the set of selectable optional features is stored in the storage location.

4. The device of claim 1 wherein the set of the selectable optional features includes a pointer to identify a storage location where the one of the set of the selectable optional features is stored.

5. The device of claim 1 wherein the at least one of the set of the selectable optional features comprises a selected one of a dialing plan system, an encryption system, a browser system, or a language system.

6. A programming system for a wireless communication device comprising:

a wireless communication device having a programmable memory, the programmable memory having a first storage location to store a main program associated with operation of the wireless communication device and a second storage location different from the first storage location;

a port coupled to the programmable memory to receive a set of selectable optional features for the wireless communication device;

a programmer coupled to the port to send the set of selectable optional features to the port for storage in the second storage location, the programmer storing the set of selectable optional features in the second storage location independently of a storing of the main program in the first storage location; and a linking element to associate the main program with the set of selectable optional features, the linking element having an indicator set by the programmer to indicate when the set of selectable optional features are stored in the second storage location.

7. The system of claim 6 wherein the linking element includes a pointer to direct the programmer where to store the set of selectable optional features in the programmable memory.

8. The system of claim 6 wherein the linking element is stored in a storage location of the programmable memory different from the first storage location.

9. The system of claim 6 wherein the set of selectable optional features includes a pointer to identify a memory location in the programmable memory.

10. The system of claim 6 wherein the linking element remains inactive until activated by the programmer, the programmer activating the linking element when the programmer sends the set of selectable optional features for storage in the second storage location.

11. A programming system for a wireless communication device comprising:

a wireless communication device having a programmable memory, the programmable memory having a first storage location to store a main program associated with operation of the wireless communication device and a second storage location different from the first storage location;

a port coupled to the programmable memory to receive a set of selectable optional features for the wireless communication device;

a programmer coupled to the port to send the set of selectable optional features to the port for storage in the second storage location, the programmer storing the set of selectable optional features in the second storage location independently of a storing of the main program in the first storage location; and a linking element to associate the main program with the set of selectable optional features, wherein the linking element includes a pointer identifying a secondary linking element, the secondary linking element having a plurality of pointers to identify memory locations in the programmable memory.

12. A programming system for a wireless communication device comprising:

a wireless communication device having a programmable memory, the programmable memory having a first storage location to store a main program associated with operation of the wireless communication device and a second storage location different from the first storage location;

a port coupled to the programmable memory to receive a set of selectable optional features for the wireless communication device;

a programmer coupled to the port to send the set of selectable optional features to the port for storage in the second storage location, the programmer storing the set of selectable optional features in the second storage location independently of a storing of the main program in the first storage location; and a linking element to associate the main program with the set of selectable optional features, wherein the set of selectable optional features includes a secondary linking element, the secondary linking element having a plurality of pointers to identify a plurality of corresponding memory locations in the programmable memory.

13. A programming system for a wireless communication device comprising:

a wireless communication device having a programmable memory, the programmable memory having a first storage location to store a main program associated with operation of the wireless communication device and a second storage location different from the first storage location;

a port coupled to the programmable memory to receive a set of selectable optional features for the wireless communication device;

a programmer coupled to the port to send the set of selectable optional features to the port for storage in the second storage location, the programmer storing the set of selectable optional features in the second storage location independently of a storing of the main program in the first storage location; and a linking element to associate the main program with the set of selectable optional features, wherein the set of selectable optional features includes a first indicator to indicate when one of the set of selectable optional features is stored in the second storage location and a second indicator to identify a memory location in the second storage location where the one of the set of selectable optional features is stored, a size of the memory location, or a type of the one of the set of selectable optional features.

14. A wireless communication device comprising:

a first storage location storing a main program associated with operation of the wireless communication device;

a second storage location programmable to store a set of selectable optional features independently from the main program;

a linking element to associate the main program with the set of selectable optional features, the linking element associating the set of selectable optional features with the main program when the second storage location is programmed to store the set of selectable optional features; and an indicator to indicate when the set of selectable optional features is stored in the second storage location;

wherein the set of selectable optional features includes a secondary linking element, the secondary linking element having a plurality of pointers to identify a plurality of corresponding memory locations in the first or second storage locations, the corresponding memory locations programmable to store a one of the set of selectable optional features.

15. The device of claim 14, wherein the linking element is a portion of the main program stored in the first storage location.

16. The device of claim 14 wherein the set of selectable optional features includes one of a dialing plan system, encryption system, browser system, or language system.

* * * * *